(12) United States Patent
Kishida

(10) Patent No.: US 8,860,996 B2
(45) Date of Patent: Oct. 14, 2014

(54) PRINTING SYSTEM, PRINTER, PRINT SERVER, AND METHOD THEREOF

(75) Inventor: Akira Kishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 13/604,381

(22) Filed: Sep. 5, 2012

(65) Prior Publication Data

US 2013/0063776 A1 Mar. 14, 2013

(30) Foreign Application Priority Data

Sep. 9, 2011 (JP) .................................. 2011-197214

(51) Int. Cl.
*G06F 3/12* (2006.01)
*G06K 15/00* (2006.01)
(52) U.S. Cl.
CPC ............ *G06F 3/1205* (2013.01); *G06F 3/1288* (2013.01); *G06F 3/1232* (2013.01); *G06F 3/1253* (2013.01); *G06F 3/122* (2013.01); *G06F 3/1228* (2013.01)
USPC .......... 358/1.15; 358/1.1; 358/1.13; 358/1.14; 358/1.16
(58) Field of Classification Search
USPC .............. 358/1.15, 1.1, 1.13, 1.14, 1.16, 501, 358/508, 448, 476; 709/225, 203, 206, 219, 709/227, 226, 238
See application file for complete search history.

(56) References Cited

U.S. PATENT DOCUMENTS

| 2003/0103226 A1* | 6/2003 | Nishio ........................ 358/1.13 |
| 2008/0318602 A1* | 12/2008 | Chang et al. .................. 455/466 |
| 2009/0201547 A1* | 8/2009 | Noguchi et al. .............. 358/1.15 |

FOREIGN PATENT DOCUMENTS

| EP | 2204731 A2 | 7/2010 |
| JP | 2005-063415 A | 3/2005 |

OTHER PUBLICATIONS

Asami, Method for Updating Printer Driver, Feb. 10, 2003, Machine Translation Japanese Patent Publication, JP2003280842, all pages.*
Mitsuo, Print System Print Server Control Method thereof and Program, Jul. 7, 2010, European Patent Application Publication Provided by IDS, EP2204731, All pages.*

* cited by examiner

*Primary Examiner* — Ngon Nguyen
(74) *Attorney, Agent, or Firm* — Canon USA, Inc., IP Division

(57) ABSTRACT

There is provided a printing system including an information processing apparatus in which a model-specific printer driver is not installed. The information processing apparatus includes a display unit and a transmission unit. The display unit controls display of an extended print setting screen for specifying a model-specific printer function using information acquired from a print server based on configuration information from a printer. The transmission unit transmits print data to the print server. The print server includes an issuing unit configured to issue a print job to the printer using print data and a print ticket containing a setting specified through the extended print setting screen.

12 Claims, 20 Drawing Sheets

FIG.5

| PRINTER | OUTPUT PORT | ... | EXTENDED PRINT FUNCTION UI | PRINT SERVER NAME | IP ADDRESS | DRIVER VERSION | FUNCTION LEVEL |
|---|---|---|---|---|---|---|---|
| Printer A | IP_xxx.xxx.xxx.xxx | ...... | NA | NA | NA | NA | NA |
| Printer B | ServerA | ...... | Installed | ServerA | xxx.xxx.xxx.xxx | 20.50.00 | 150 |
| Printer C | ServerB | ...... | Installed | ServerB | xxx.xxx.xxx.xxx | 10.00.00 | 50 |
| Printer D | ServerC | ...... | NA | NA | NA | NA | NA |

FIG.8

| HOST NAME | ServerA |
|---|---|
| IP ADDRESS | xxx.xxx.xxx.xxx |
| DRIVER VERSION | 20.50.00 |
| FUNCTION LEVEL | 150 |
| SHARING SETTING | Available |
| UI MODULE PATH | ¥¥ServerA¥printerdriver¥UImodule |

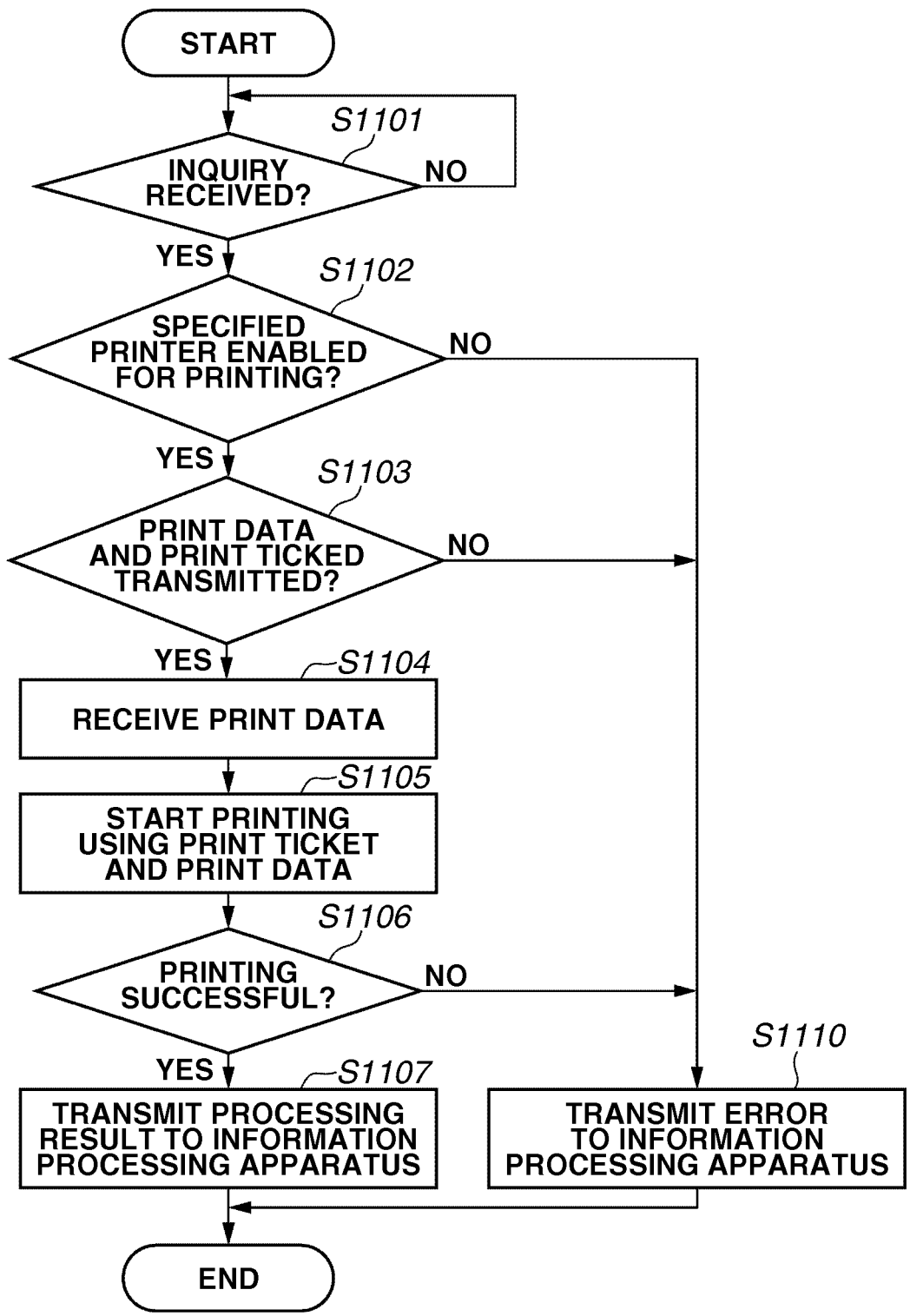

FIG.12A

PRINT

GENERAL

SELECT PRINTER
☐ ADD PRINTER
☐ Cxxxx iR C2110 Lxxxxx XXX
☐ Cxxxx iR C5185-192.168.0.1 *1201*
☐ Fax
☐ LXX2810
☐ Mxxxxxxxx XXX Document

STATE: READY
LOCATION:
COMMENT:

☐ OUTPUT TO FILE(F)      [DETAILED SETTING(R)] *1202*
                         [PRINTER SEARCH(D)]

PAGE RANGE *1204*
⦿ ALL(L)
○ SELECTED PORTION(T)    ○ CURRENT PAGE(U)
○ SPECIFY PAGE(G) [_____]

COPIES(C): [1] *1203*
☐ PRINT IN COPIES(O)     [1][2][3]

[PRINT(P)]  [CANCEL]  [APPLY(A)]
  *1205*     *1206*    *1207*

Cxxxx iR C5185-192.168.0.1 Properties

| PAGE SETTING | FINISH | PAPER FEED | PRINT QUALITY |

OUTPUT METHOD(M): PRINT

DOCUMENT SIZE(S): A4
OUTPUT PAPER SIZE(Z): SAME AS DOCUMENT SIZE
COPIES(C): 1 COPIES (1~9999)
PRINT ORIENTATION(O): VERTICAL / HORIZONTAL
PAGE LAYOUT(L): ONE PAGE/SHEET (STANDARD)
☐ SPECIFY SCALE(N)
    SCALE(G) 100 % (25~200)
☐ STAMP(K) CONFIDENTIAL

A4 (SCALE: AUTOMATIC)
CONFIRM SETTING(V)

USER-DEFINED PAPER(U)... PAGE OPTION(E) EDIT STAMP(J)

OK  Cancel  REVERT TO STANDARD(R)  Help 1240, 1241, 1242, 1243

FIRST EXEMPLARY EMBODIMENT

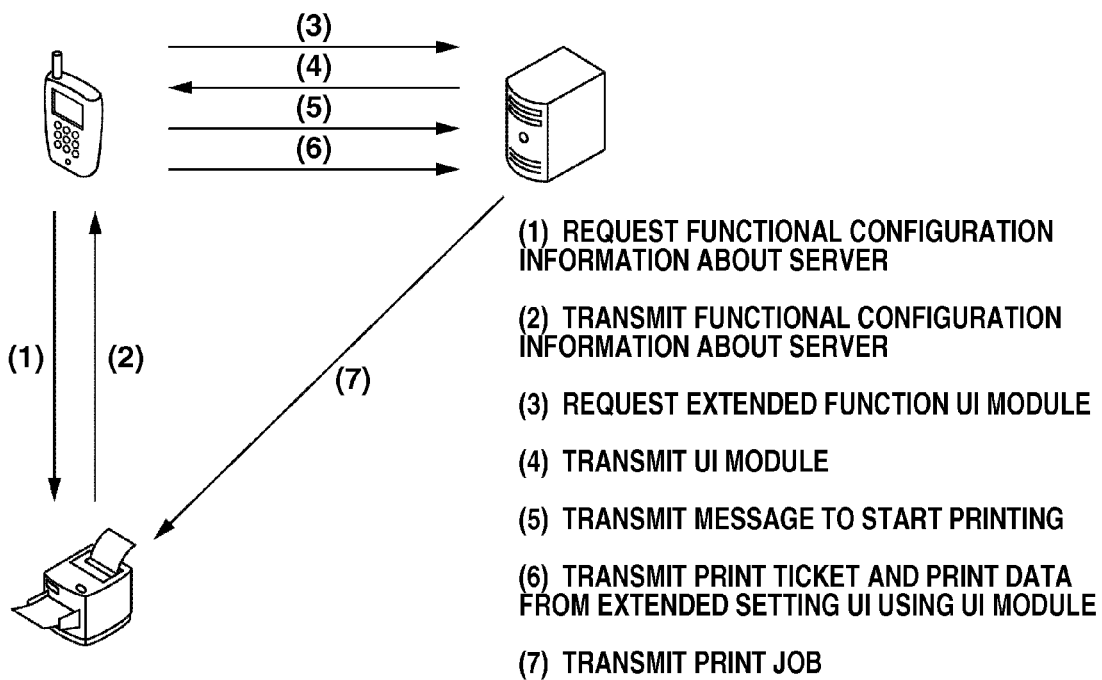

(1) REQUEST FUNCTIONAL CONFIGURATION INFORMATION ABOUT SERVER (2) TRANSMIT FUNCTIONAL CONFIGURATION INFORMATION ABOUT SERVER (3) REQUEST EXTENDED FUNCTION UI MODULE (4) TRANSMIT UI MODULE (5) TRANSMIT MESSAGE TO START PRINTING (6) TRANSMIT PRINT TICKET AND PRINT DATA FROM EXTENDED SETTING UI USING UI MODULE (7) TRANSMIT PRINT JOB

SECOND EXEMPLARY EMBODIMENT

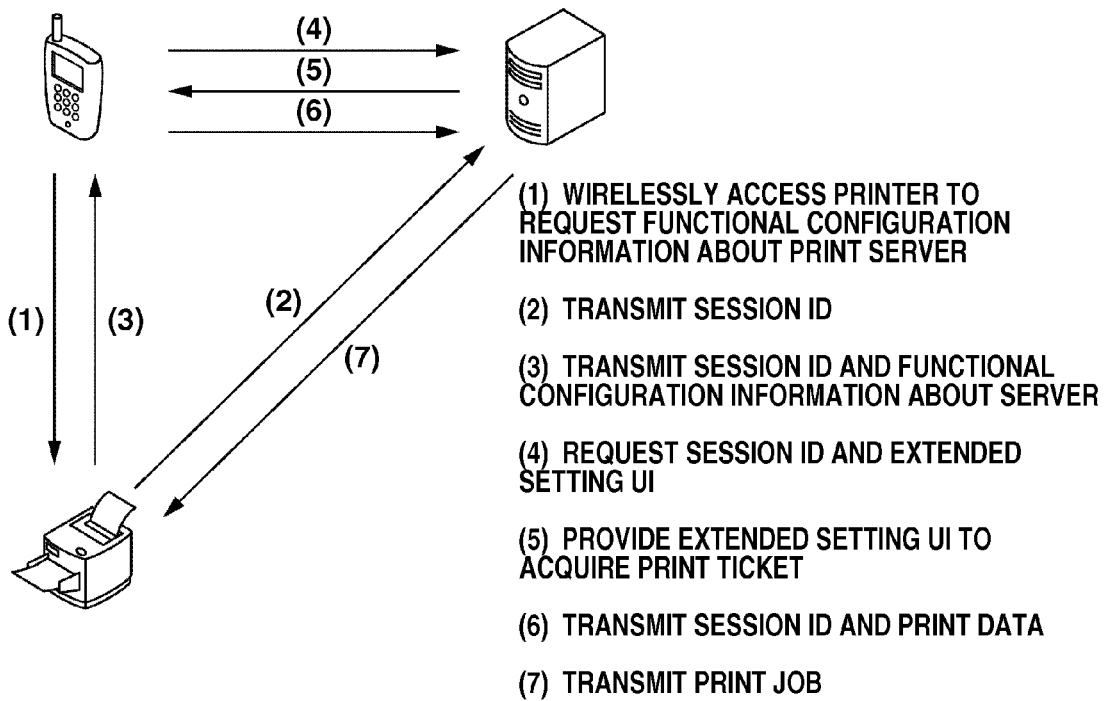

(1) WIRELESSLY ACCESS PRINTER TO REQUEST FUNCTIONAL CONFIGURATION INFORMATION ABOUT PRINT SERVER (2) TRANSMIT SESSION ID (3) TRANSMIT SESSION ID AND FUNCTIONAL CONFIGURATION INFORMATION ABOUT SERVER (4) REQUEST SESSION ID AND EXTENDED SETTING UI (5) PROVIDE EXTENDED SETTING UI TO ACQUIRE PRINT TICKET (6) TRANSMIT SESSION ID AND PRINT DATA (7) TRANSMIT PRINT JOB

PRINTING SYSTEM, PRINTER, PRINT SERVER, AND METHOD THEREOF

BACKGROUND OF THE INVENTION

1. Field of the Invention

The present invention relates to a print technology in a printing system including a printer and a print server available on a network.

2. Description of the Related Art

There are broadly two methods for using a networked printer for printing from information processing apparatuses such as a personal computer (PC) and a personal digital assistance (PDA). One is installing a printer driver and activating an application on an information processing apparatus for printing. The other one is such that an information processing apparatus requests printing from a networked printing service that performs printing.

The former method allows the information processing apparatus to use a networked printer for printing if the printer driver is installed and the printer Internet Protocol (IP) address is allocated to a Transmission Control Protocol/Internet Protocol (TCP/IP) port of the printer. The latter method can perform printing by using a print application for printing documents which are targets of the printing service on the network. A print application having the function equivalent to the printer driver is used for printing.

Printer drivers include a model-specific driver and a basic printer driver. The model-specific driver covers features specific to printer models. The basic printer driver covers only general printer functions such as specifying the number of copies. The model-specific driver provides special printer functions by connecting to corresponding models or enabling options for image processing, high-precision rendering, and print job concatenation.

A personal computer (PC) requires higher capabilities of a central processing unit (CPU) and memory to execute the model-specific driver than the basic printer driver. However, the model-specific driver can provide functions (user interfaces in particular) of effectively using printers and is therefore widely used for commercial products.

Japanese Patent Application Laid-Open No. 2005-63415 discusses a technique for providing users with a user interface for printing. According to Patent Application Laid-Open No. 2005-63415, the printer driver displays a print setting screen by referring to a web page provided from the network printer.

Accordingly, a similar setting screen can be provided regardless of a type of operating system (OS) on which the printer driver operates. The model-specific driver may be installed to disable reference to the web page provided from the network printer. In such a case, the model-specific driver provides an ordinary setting screen.

However, the above-mentioned printing system does not take an environment into consideration. For example, only the basic printer driver can operate due to restrictions on the memory or the central processing unit (CPU) of the information processing apparatus or due to the security of inhibiting installation of the model-specific driver. A technique that allows users to easily use convenient functions specific to printer types under the environment where only the basic printer driver can operate, is desired.

SUMMARY OF THE INVENTION

According to an aspect of the present invention, there is provided a printing system including an information processing apparatus not installed with a printer driver for enabling a model-specific printer function, a print server, and a printer. The printer includes a response unit configured to respond to a request from a connected information processing apparatus with configuration information about a print server. The information processing apparatus includes a display unit configured to control display of an extended print setting screen to specify a model-specific printer function using information acquired from a print server based on the configuration information, and a transmission unit configured to transmit print data to the print server. The print server includes an issuing unit configured to issue a print job to the printer using a print ticket and print data containing setting specified through the extended print setting screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a table illustrating registered printer information in the information processing apparatus according to the first exemplary embodiment.

FIG. 8 is a table illustrating an example of functional configuration information about the print server according to the first exemplary embodiment.

FIG. 11 is a flowchart illustrating print processing using the extended print setting for the print server according to the first exemplary embodiment.

FIGS. 12A, 12B, and 12C are an example transition diagram illustrating print UIs on the information processing apparatus according to the first exemplary embodiment.

FIG. 18 illustrates a processing flow of an entire system when the extended print setting is used for printing according to an exemplary embodiment.

DESCRIPTION OF THE EMBODIMENTS

Various exemplary embodiments, features, and aspects of the invention will be described in detail below with reference to the drawings.

Figure 1:
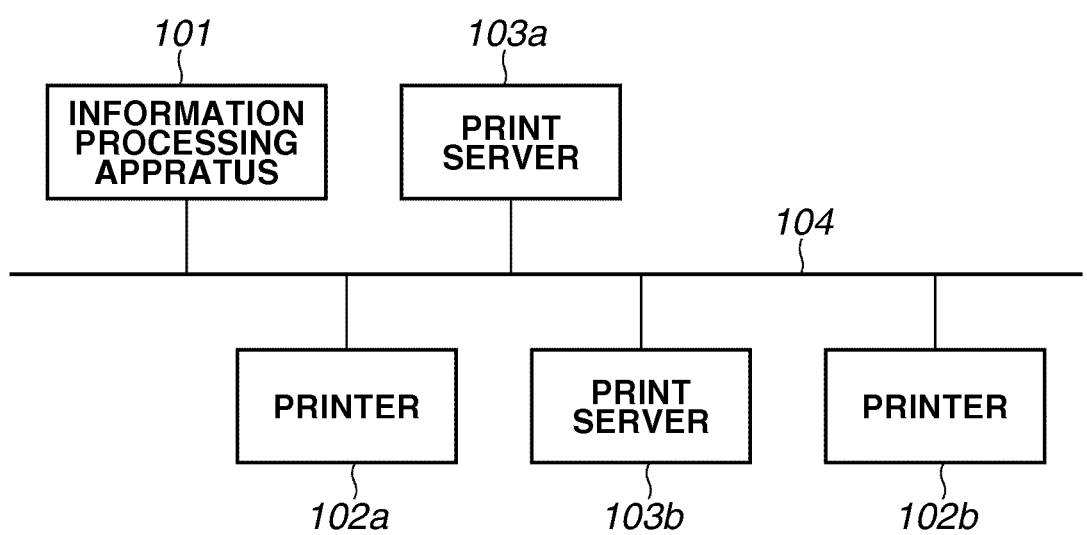
FIG. 1 is a block diagram illustrating an example system configuration according to an exemplary embodiment of the invention.

FIG. 1 is a block diagram illustrating a schematic configuration of a network system according to an exemplary embodiment of the present invention. The network system includes an information processing apparatus 101 and one or more printers 102a, 102b, and so on that receive print data from the information processing apparatus 101 for printing.

These components are connected through a network 104 based on Ethernet (registered trademark). A print server 103 is connected to a printer 102 through the network 104. Communication between the printer and the information processing apparatus can be performed by using various techniques such as a near field communication that can easily provide network connection.

Figure 2:
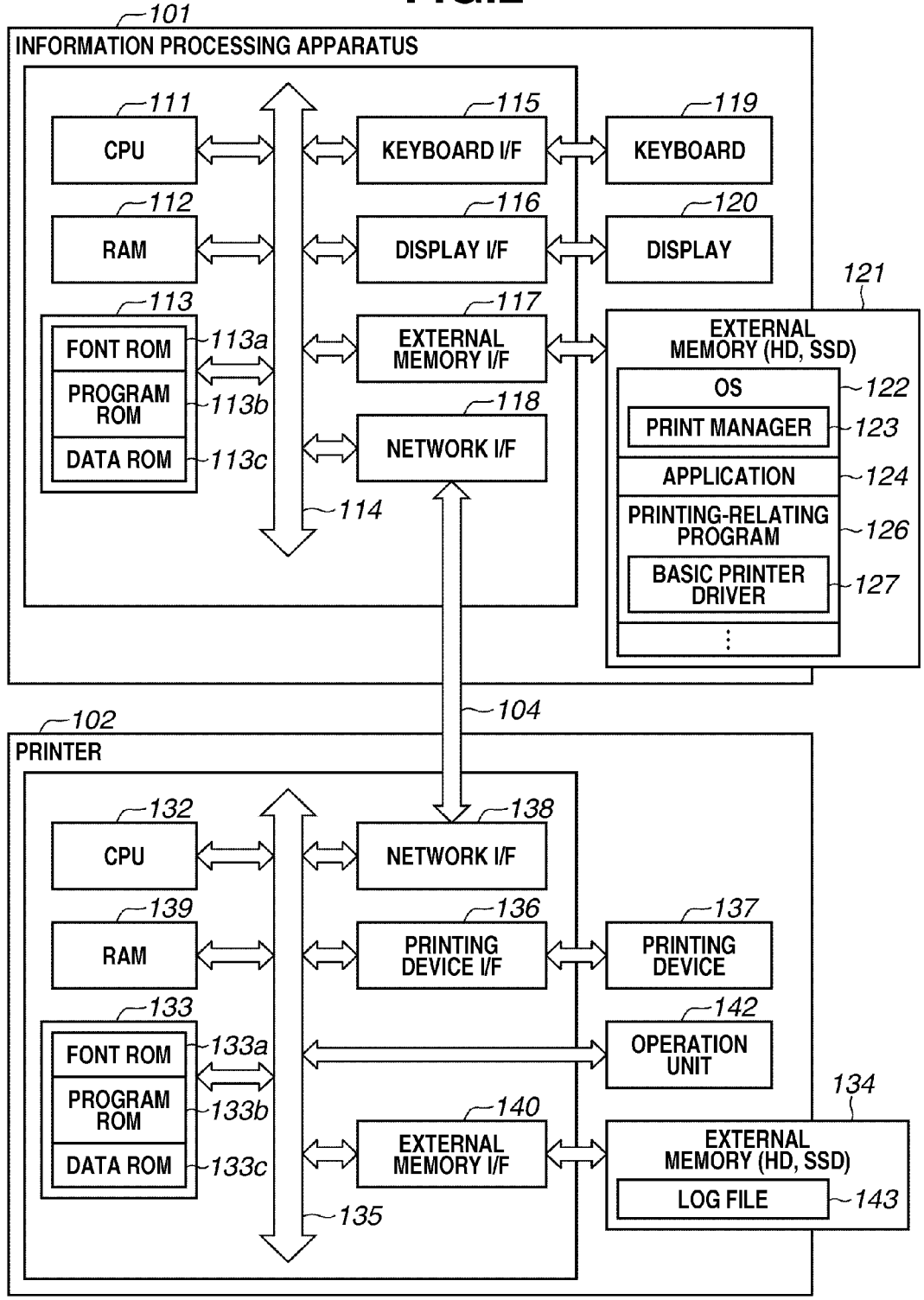
FIG. 2 is a block diagram illustrating internal apparatus configurations of an information processing apparatus and a printer according to an exemplary embodiment of the invention.

FIG. 2 is a block diagram illustrating apparatus configurations of the information processing apparatus 101 and the printer 102 illustrated in FIG. 1.

In the information processing apparatus 101, a CPU 111 collectively controls apparatuses connected to a system bus 122 according to a program stored in a random access memory (RAM) 112. The RAM 112 also functions as a main memory and a work area for the CPU 111. A read-only memory (ROM) 113 stores various programs and data.

A keyboard I/F 115 controls key input from a keyboard 119 or a pointing device (not illustrated) such as a touch panel. A display I/F 116 controls display on a display 120. An external memory I/F 117 controls access to an external memory 121 such as a Solid State Disk (SSD).

A network I/F 118 is connected to the printer 102 through the network 104 and controls communication with the printer 102. The external memory I/F 117 controls access to the external memory 121 such as a flash memory and an SSD.

The external memory 121 stores an operating system program (hereinafter referred to as an OS) 122, an application 124, and a printing-related program 124. The external memory 121 also stores a user file, registered printer information, and an edition file (not illustrated). The external memory 121 functions as a storage medium which the information processing apparatus can read.

The printing-related program 126 includes a basic printer driver 127 according to the present exemplary embodiment. The basic printer driver 127 enables printing on the printer 102 and is included in the operating system (OS) 122 as standard. In the information processing apparatus according to the present exemplary embodiment, the basic printer driver 127 operates under various restrictions.

The configuration of the printer 102 will be described. The CPU 132 controls overall operation of the printer 102.

A RAM 139 functions as a main memory and a work area for the CPU 132. The RAM 139 is also used as an output information rasterization area or an environment data storage area. The RAM 139 also includes non-volatile RAM (NVRAM). Connecting option RAM to an expansion port (not illustrated) can increase the memory capacity.

A ROM 133 includes a font ROM 133a, a program ROM 133b, and a data ROM 133c. The font ROM 133a stores various fonts. The program ROM 133b stores a control program to be executed by the CPU 132. The data ROM 133c stores various data. A network I/F 138 exchanges data with the information processing apparatus 101.

A printing device I/F 136 controls interface with a printing device 137 serving as a printer engine. An external memory I/F 140 controls access to external memory 134 that includes an optionally connected hard disk (HD) and SSD.

The external memory 134 stores font data, an emulation program, and form data. The external memory 134 can store a log file 143 according to the present exemplary embodiment. The external memory 134 such as a hard disk may not be connected. In such a case, the data ROM 133c in the ROM 133 stores information used for the information processing apparatus 101.

One or more units of external memory 134 may be provided. For example, a plurality of external memories, such as an optional font card in addition to the built-in font, and an external memory storing a program to interpret different printer control languages, may be connected to the printer 102.

An operation unit 142 is provided with an operation panel for receiving a user operation. The operation panel includes switches and light-emitting diode (LED) indicators (not illustrated) for operations. The operation unit 142 may include NVRAM (not illustrated) to store printer mode setting information from the operation panel.

The CPU 132 outputs an image signal as output information to the printing device 137 through the printing device I/F 136 based on the control program stored in the program ROM 133b in the ROM 133. The CPU 132 can communicate with the information processing apparatus 101 through the network I/F 138. The CPU 132 can receive print data transmitted from the information processing apparatus 101 and notify the information processing apparatus 101 of information about the printer 102.

Figure 3:
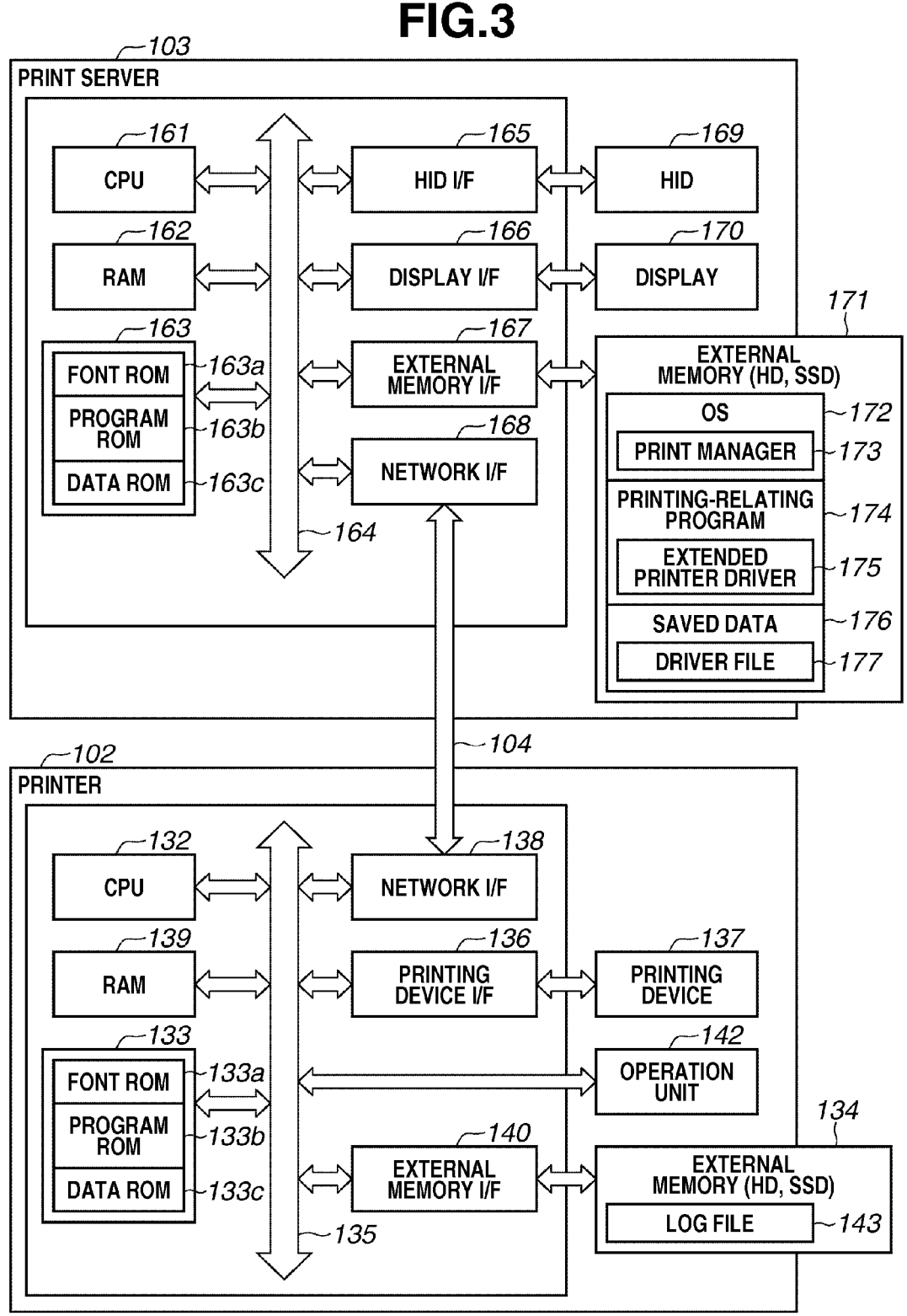
FIG. 3 is a block diagram illustrating internal apparatus configurations of a print server and the printer according to an exemplary embodiment of the invention.

FIG. 3 is a block diagram illustrating apparatus configurations of the print server 103 and the printer 102 illustrated in FIG. 1. The configuration of the printer 102 completely equals to that illustrated in FIG. 2, and a description thereof is omitted.

In the print server 103, a CPU 161 overall controls apparatuses connected to a system bus 172 according to a program stored in a RAM 162. The RAM 162 also functions as a main memory and a work area for the CPU 161.

A ROM 163 stores various programs and data. A human interface device (HID) I/F 165 provides interface with a human interface device and controls key input from an HID 169 or a pointing device such as a touch panel. A display I/F 166 controls display on a display 170.

An external memory I/F 167 controls access to external memory 171 such as a flash memory and an SSD. A network I/F 168 is connected to the printer 102 through the network 104 and controls communication with the printer 102.

The external memory 171 stores an OS 172 and a printing-related program 174 as well as a user file, registered printer information, and an edition file (not illustrated). The external memory 171 functions as a storage medium that can be read by the information processing apparatus. The OS 172 includes a print manager 173 according to the present exemplary embodiment.

The print manager 173 is a module that manages the operation of the print server. A print job is transmitted to the printer 102. The print manager 173 temporarily stores the print job in the print server 103, processes the print job by an extended printer driver 175, and converts the print data into the Page Description Language (PDL) that can be interpreted by the printer. The print manager 173 then transmits the converted print job to the printer 102.

The printing-related program 174 includes the extended printer driver 175. The extended printer driver includes a high-performance model-specific driver. In the present exemplary embodiment, it is referred to as an extended printer driver in contrast with the basic printer driver.

Saved data 176 includes a driver file 177 that stores a file needed for the extended printer driver 175 to use the printer as a shared printer. In the driver file 177, a system with which a UI module can be installed as a type of application. The UI module can provide an UI equivalent to a software module that can provide the UI corresponding to the extended printer driver 175.

Figure 4:
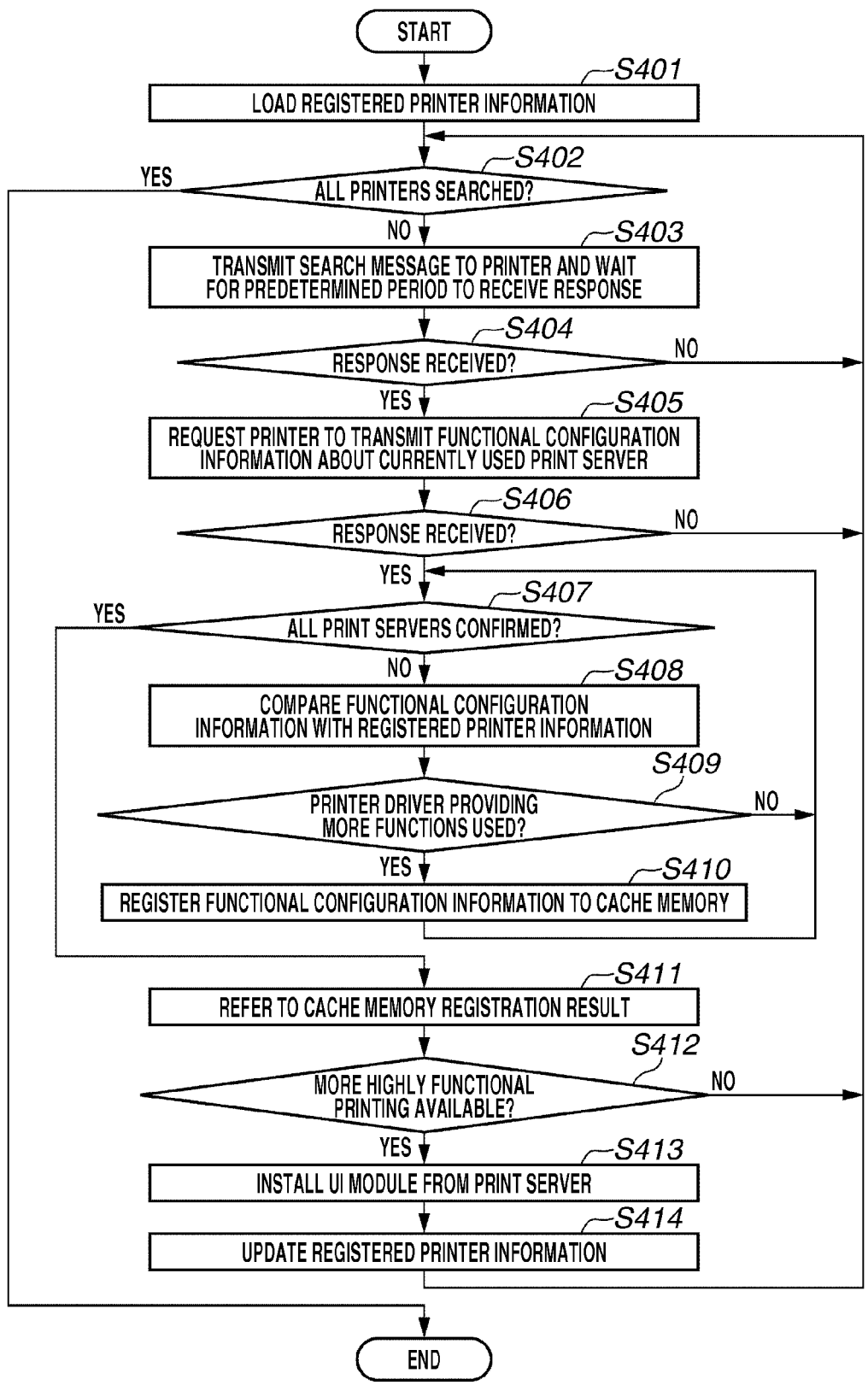
FIG. 4 is a flowchart illustrating searching processing of an extended print function of the information processing apparatus according to a first exemplary embodiment.

FIG. 4 is a flowchart illustrating searching processing by an extended print function of the OS 122 for the information processing apparatus 101. Suppose that the basic printer driver is installed in the information processing apparatus 101, and the printer 102 is registered as an available printer on the OS 122.

The OS 122 and the print manager 123 are loaded into the RAM 112 in the information processing apparatus 101 and are executed. In step S401, the OS 122 and the print manager 123 load the registered printer information stored in the external memory 121 into the RAM 112.

The registered printer information will be described in detail with reference to FIG. 5. The registered printer information contains information about a printer (the printer 102 in this example) registered to the information processing apparatus 101.

In step S402, the print manager 123 determines whether the searching processing to be described below is performed on all registered printers. If the searching processing is performed on all the printers (YES in step S402), then the print manager 123 terminates the searching processing by the extended print function. If the searching processing is not performed on all the printers (NO in step S402), then the processing proceeds to step S403.

In step S403, the print manager 123 transmits a search message to the printer registered to the registered printer information and waits for a predetermined period to receive a response. In step S404, the print manager 123 confirms whether a response is received. If a response is received (YES in step S404), the processing proceeds to step S405. If no response is received and a timeout occurs (NO in step S404), the processing returns to step S402.

In step S405, the print manager 123 requests the printer to transmit functional configuration information about a print server that currently uses the printer. The functional configuration information will be described in detail with reference to FIG. 8 below. In step S406, the print manager 123 confirms whether a response including the functional configuration information is received. If a response is received (YES in step S406), the processing proceeds to step S407. If no response is received and a timeout occurs (NO in step S406), the processing returns to step S402.

In step S407, the print manager 123 determines whether the functional configuration information about all print servers has been confirmed. If the functional configuration information is confirmed about all the print servers (YES in step S407), the processing proceeds to step S411. If the functional configuration information is not confirmed about all the print servers (NO in step S407), the processing proceeds to step S408. In step S408, the print manager 123 compares the functional configuration information about the print server with the registered printer information.

In step S409, the print manager 123 uses the comparison result and determines whether the functional configuration information about the print server indicates the use of a printer driver providing more functions. If a printer driver providing more functions is used (YES in step S409), the processing proceeds to step S410. If a printer driver providing more functions is not used (NO in step S409), the processing returns to step S407.

In step S410, the print manager 123 temporarily registers the functional configuration information about the print server determined to have more functions into a cache memory such as the RAM 112. Then, the processing returns to step S407.

In step S411, the print manager 123 refers to a cache memory registration result in step S410. If the functional configuration information is registered to the cache memory (YES in step S412), the processing proceeds to step S413. This is because the print manager 123 can determine that the use of the print server function enables more highly functional printing.

If the functional configuration information is not registered to the cache memory (NO in step S412), the processing returns to step S402. In step S413, the print manager 123 accesses the driver file 177 of the print server based on the functional configuration information registered to the cache memory. The print manager 123 installs a UI module through the network 104. In step S414, the print manager 123 updates the registered printer information based on the installed UI module. Then, the processing returns to step S402.

FIG. 5 is a table illustrating the registered printer information managed by the OS on the information processing apparatus according to the present exemplary embodiment. The registered printer information also contains information for printer management performed by the print manager 123 specific to the present exemplary embodiment. The print manager 123 periodically performs the process illustrated in FIG. 4 at a proper timing such as startup, and updates the contents of the registered printer information.

The registered printer information contains characteristic information such as an extended print setting UI, a print server name, an IP address, a driver version, and a function level. The extended print setting UI provides status information indicating whether the UI module is additionally installed in each printer.

The print server name indicates the name of the print server 103 that provides the extended print function. The IP address indicates the print server IP address. Network information other than the IP address can be used.

The driver version indicates the version of the extended printer driver 175 installed in the print server 103 that provides the extended print function. A larger printer driver version number may indicate more print functions to be provided. In such a case, the version number can be used to compare function levels. The function level provides numeric comparative information about print functions available to the same printer 102.

The amounts of functions and setting contents available from each printer driver is converted into numeric information according to a predetermined rule. The present exemplary embodiment uses the function level that allows comparison between driver functions to be easier.

Instead of the function level, however, functions and setting items may be listed for management so that they can be compared with each other. Such a technique can be used to perform the process to be described below.

Though not illustrated in FIG. 5, the registered printer information saves a print setting if the user specifies the print setting by using an extended print setting UI (not illustrated). If the registered printer information already contains extended print setting, this indicates that the printer was used with the extended print setting specified.

Figure 6:
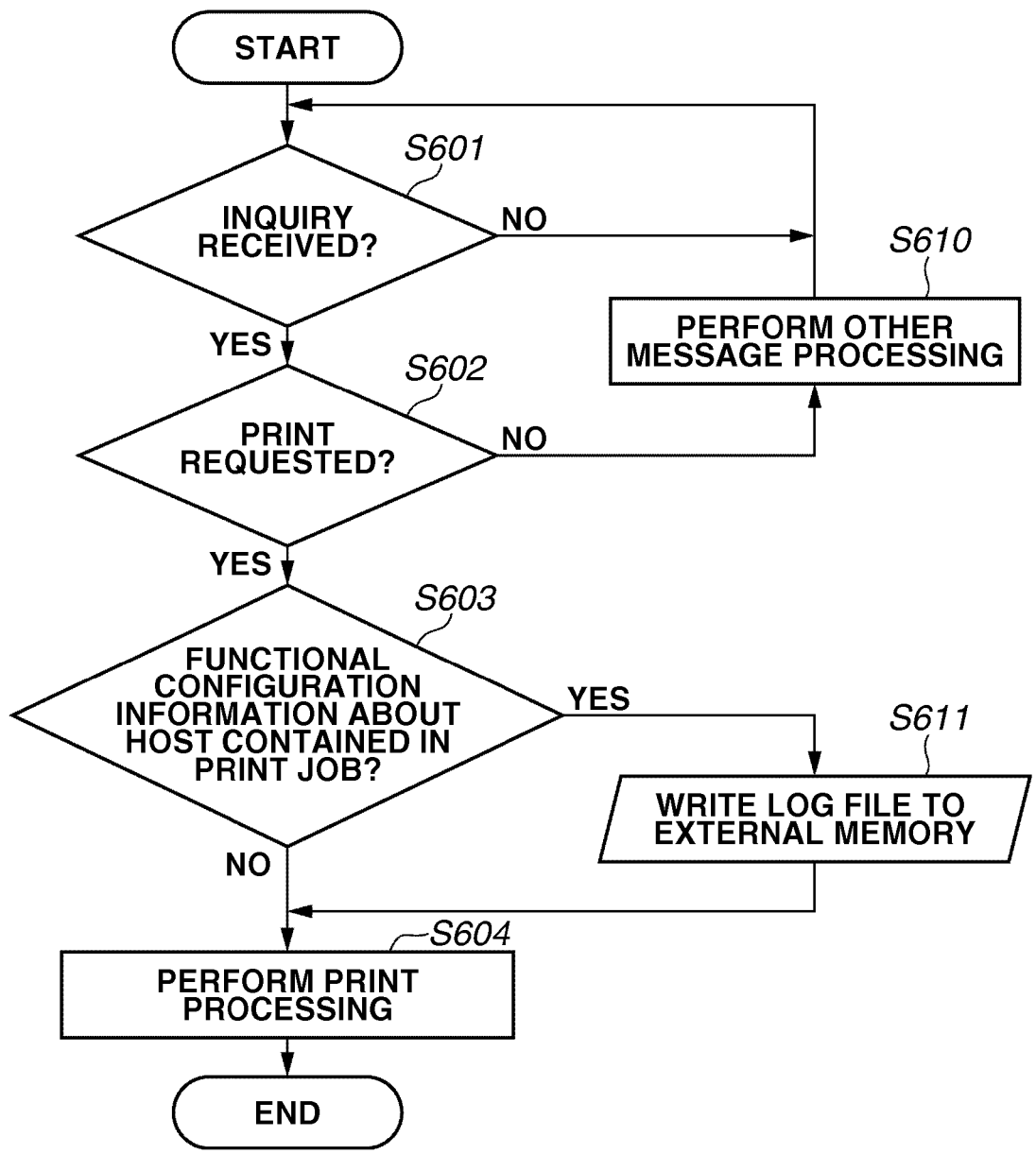
FIG. 6 is a flowchart illustrating collecting processing of functional configuration information of the printer according to the first exemplary embodiment.

FIG. 6 is a flowchart illustrating collecting processing of the functional configuration information about the print server. The print server 103 according to the present exemplary embodiment is already connected to the printer 102 and in cooperation with the printer 102 in printing.

In step S601, the printer 102 determines whether an inquiry is received from the information processing apparatus 101 or the print server 103. If no inquiry is received (NO in step S601), the printer 102 repeats the check. If an inquiry is received (YES in step S601), the processing proceeds to step S602.

In step S602, the printer 102 determines whether a print request is received. If a print request is received (YES in step S602), the processing proceeds to step S603. Otherwise (NO in step S602), the processing proceeds to step S610. In step S610, the printer 102 performs other processing needed for the received request. The printer 102 transmits a response to the information processing apparatus 101 or the print server 103, and then the processing returns to step S601.

In step S603, the printer 102 checks whether the print request contains the functional configuration information. If no functional configuration information is contained (NO in step S603), the processing proceeds to step S604. If the functional configuration information is contained (YES in step S603), the processing proceeds to step S611. In step S611, the printer 102 writes the functional configuration information as the log file 143 to the external memory 134, and the processing proceeds to step S604. In step S604, the printer 102 performs print processing corresponding to the print request, and then terminates the main processing.

Figure 7:
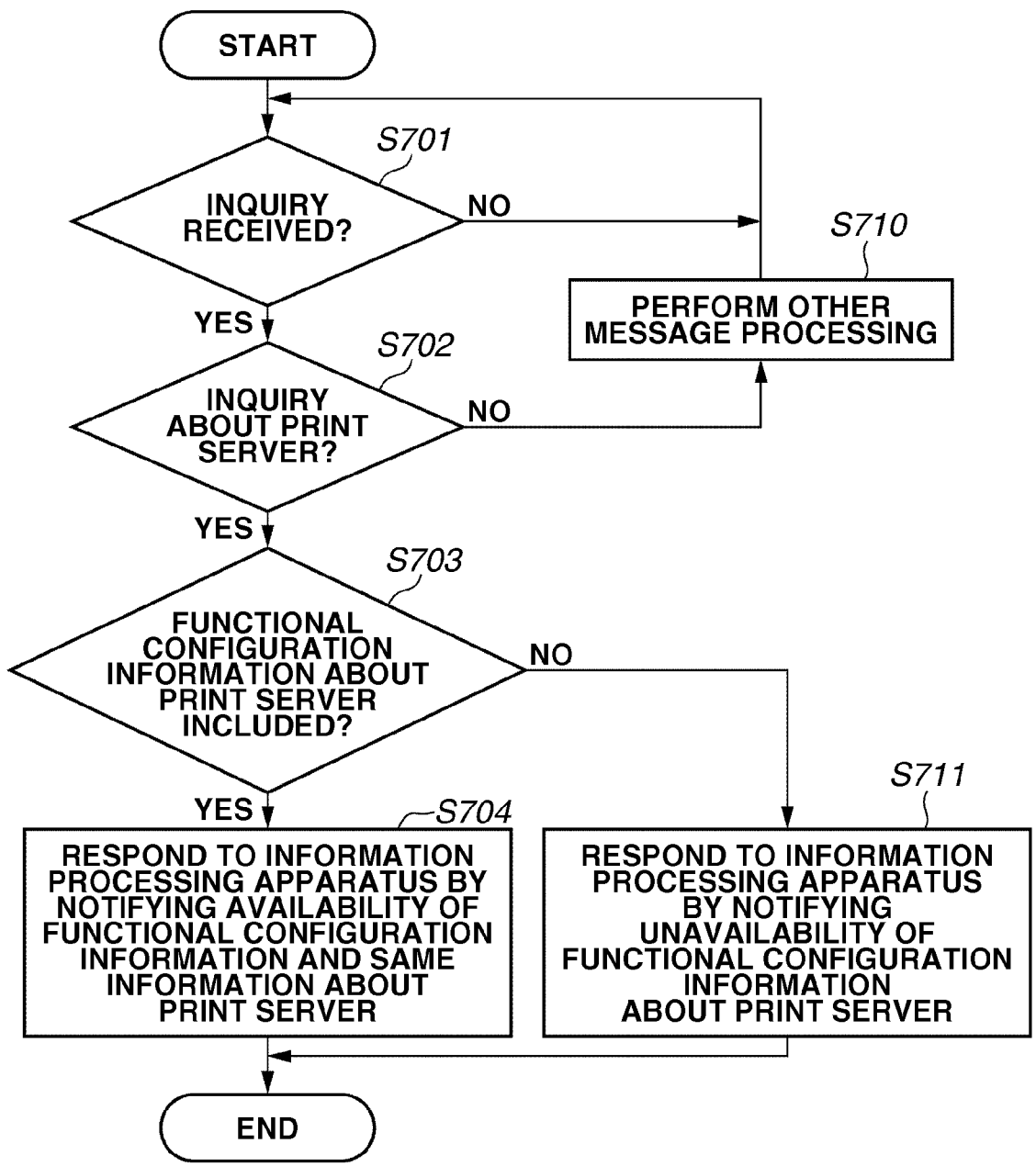
FIG. 7 is a flowchart illustrating searching processing of the extended print function of the printer according to the first exemplary embodiment.

FIG. 7 is a flowchart illustrating an example of searching processing of the extended printer function performed on the printer 102. Herein, the processing performed by the printer 102 that has received the request in step S405 illustrated in FIG. 4, will be described.

In step S701, the printer 102 checks whether an inquiry is received from the information processing apparatus 101. If an inquiry is received (YES in step S701), the processing proceeds to step S702. In step S702, the printer 102 determines whether the inquiry is about the print server 103. If the inquiry is about the print server 103 (YES in step S702), the processing proceeds to step S703. Otherwise (NO in step S702), the processing proceeds to step S710. In step S710, the printer 102 performs necessary processing according to the received inquiry. The printer 102 returns a response to the information processing apparatus 101, and the processing returns to step S701.

In step S703, the printer 102 refers to the log file 143 in the external memory 134, and checks whether the log file 143 contains the functional configuration information. If the functional configuration information is contained (YES in step S703), the processing proceeds to step S704. If the functional configuration information is not contained (NO in step S703), the processing proceeds to step S711.

In step S711, the printer 102 responds to the request from the information processing apparatus 101 by notifying unavailability of the functional configuration information. Then, the printer 102 terminates the processing. In step S704, the printer 102 responds to the request from the information processing apparatus 101 by notifying availability of the functional configuration information and the functional configuration information about the print server 103. Then, the printer 102 terminates the processing.

FIG. 8 illustrates the functional configuration information about the print server according to the present exemplary embodiment. As described above, the print manager 123 of the information processing apparatus 101 uses the functional configuration information in steps S408 through S410 in FIG. 4.

When the OS 172 operating on the print server 103 issues a print job to the printer and, the functional configuration information is included in the print job. The functional configuration information contains part of the printer information as illustrated in FIG. 5 as well as other information such as a sharing setting and a UI module path.

When the sharing setting indicates "Available", the print server 103 manages the printer 102 as a shared printer. In this case, the printer 102 can perform print processing that uses functions of the printer driver operating on the print server 103.

The UI module path specifies the location of the driver file 177 that is required to install the UI module concerning the extended print function on the information processing apparatus 101.

Figure 9:
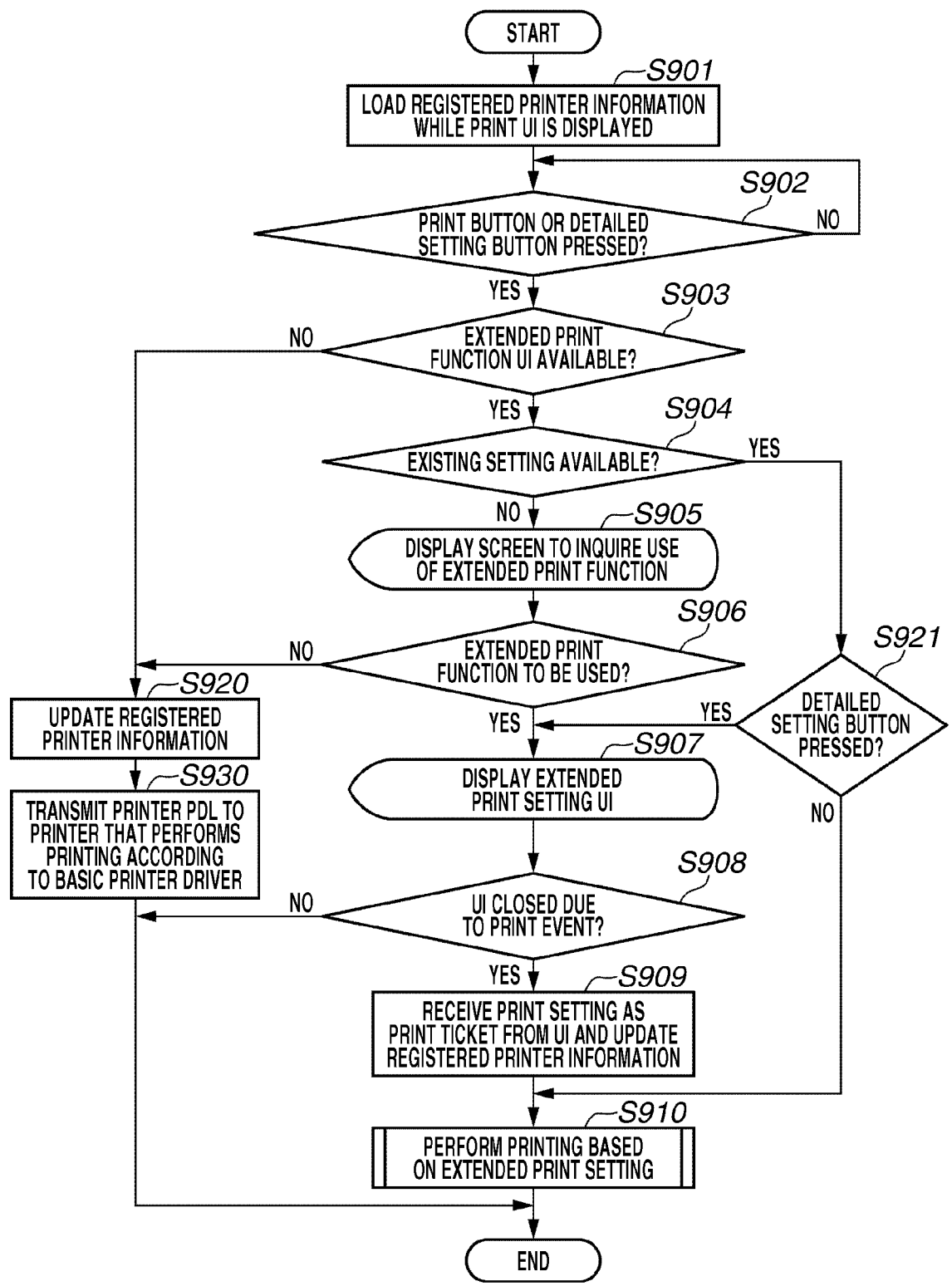
FIG. 9 is a flowchart illustrating switching display processing of a user interface (UI) and an environment construction processing for the information processing apparatus according to the first exemplary embodiment.

FIG. 9 is a flowchart illustrating UI switching processing of changing the UI displayed on the information processing apparatus 101 and construction processing of constructing the print environment. The processing starts when the user activates the application 124 operating on the information processing apparatus 101 and presses a button from a menu of the application 124 to display a print setting screen.

In step S901, the information processing apparatus 101 displays a print setting screen, that is, a print UI 1200 illustrated in FIG. 12. At this timing, the information processing apparatus 101 loads the registered printer information from a user file or the registry in the external memory 121.

An application-specific print UI may be displayed as the print setting screen. Pressing a cancel button 1206 on the print UI 1200 forcibly stops the processing described below.

In step S902, the print manager 123 as part of the OS 122 determines whether a print button 1205 or a detailed setting button 1202 is pressed. The print manager 123 waits until the button is pressed.

If the button is pressed (YES in step S902), the processing proceeds to step S903. The print manager 123 reads the registered printer information about the printer 102 selected in a printer selection portion 1201. The print manager 123 determines whether the UI module is installed and an extended print function UI is available.

If the extended print function UI is unavailable (NO in step S903), the processing proceeds to step S920. If the extended print function UI is available (YES in step S903), the processing proceeds to step S904. By the processing illustrated in FIG. 4, the UI module acquired from the print server 103 is installed in the information processing apparatus 101. In step S903, the print manager 123 determines that the extended print function UI is available.

In step S904, the print manager 123 determines whether the registered printer information saves a setting, as an existing setting, having specified through extended print setting UI in the past. If no existing setting is registered (NO in step S904), the processing proceeds to step S905. If an existing setting is registered (YES in step S904), the processing proceeds to step S921.

Figure 13:
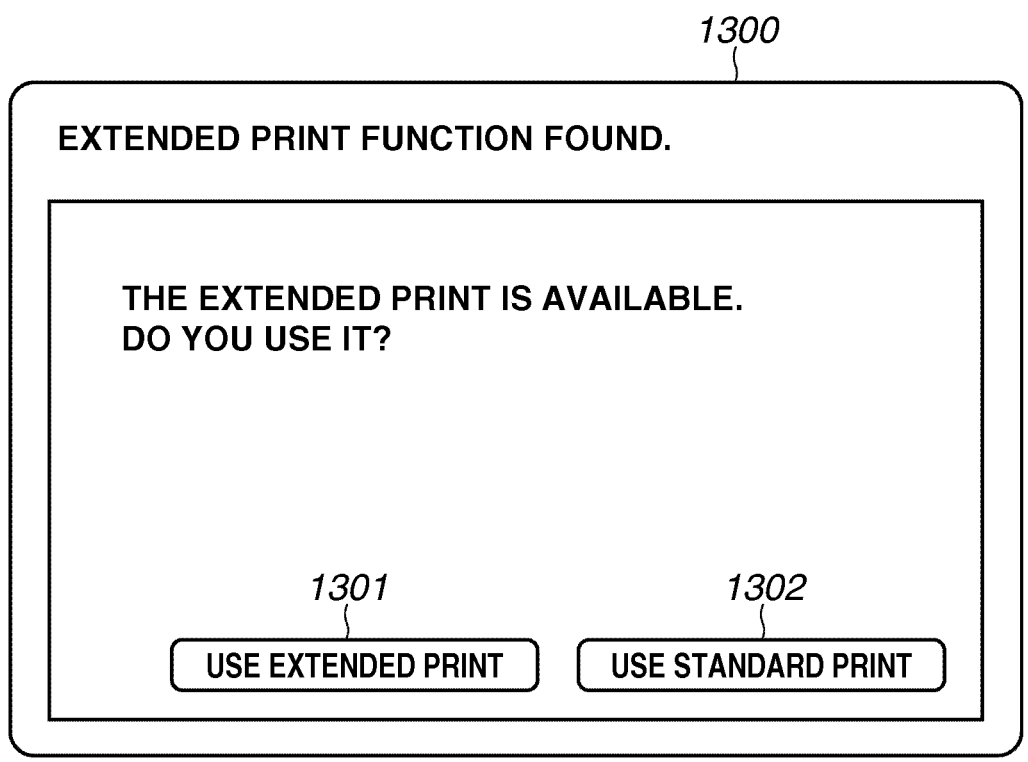
FIG. 13 illustrates an example UI providing a UI selection message according to the first exemplary embodiment.

In step S905, the print manager 123 displays a message and a screen 1300 (see FIG. 13) inquiring the user whether to use the extended print function. This screen is displayed when the user uses the extended print function for the first time.

In step S906, the print manager 123 determines whether a button 1301 is pressed on the screen 1300 to use the extended print function. If the button 1301 is pressed (YES in step S906), the processing proceeds to step S907. If a button 1302 is pressed not to use the extended print function (NO in step S906), the processing proceeds to step S920.

In step S921, the print manager 123 determines whether the detailed setting button 1202 is pressed in step S902. If the detailed setting button 1202 is pressed, the processing proceeds to step S907. If the print button 1205 is pressed, the processing proceeds to step S910.

In step S907, the print manager 123 reads print context data, that is, print instruction information included in the application 124. The print manager 123 displays an extended print setting UI 1240 while referring to the print context data.

In step S908, the print manager 123 waits an event that the UI is closed. This event signifies that the user has terminated the setting operation. Specifically, the print manager 123 determines whether an OK button 1222 or a cancel button 1223 is pressed to close the extended print setting UI 1240, and then the print button 1205 is pressed to generate a print execution event and close the print UI 1200.

If the print UI 1200 is not closed due to the print execution event such as forced termination of the application (NO in step S908), the print manager 123 terminates the processing.

If the print UI 1200 is generated by the print execution event and closed (YES in step S908), the print manager 123 receives the print setting as a print ticket from the print UI 1200. The print manager 123 updates the existing setting of the registered printer information by using the setting in the extended print setting UI. Then, the processing proceeds to step S910 to perform print processing based on the extended print setting, and the processing is terminated. The print processing will be described with reference to FIG. 10.

In step S902, the print manager 123 updates the registered printer information as needed by saving the information about the extended print function not having been used in the registered printer information. However, this step may be omitted because step S904 operates normally if the existing setting is not saved.

In step S903, the basic printer driver 127 generates page description language (PDL) data reflecting the settings of the print UI 1200 using data such as the document from the application 124, and transmits the PDL data as a print job to the printer. Then, the print manager 123 terminates the main processing.

Figure 10:
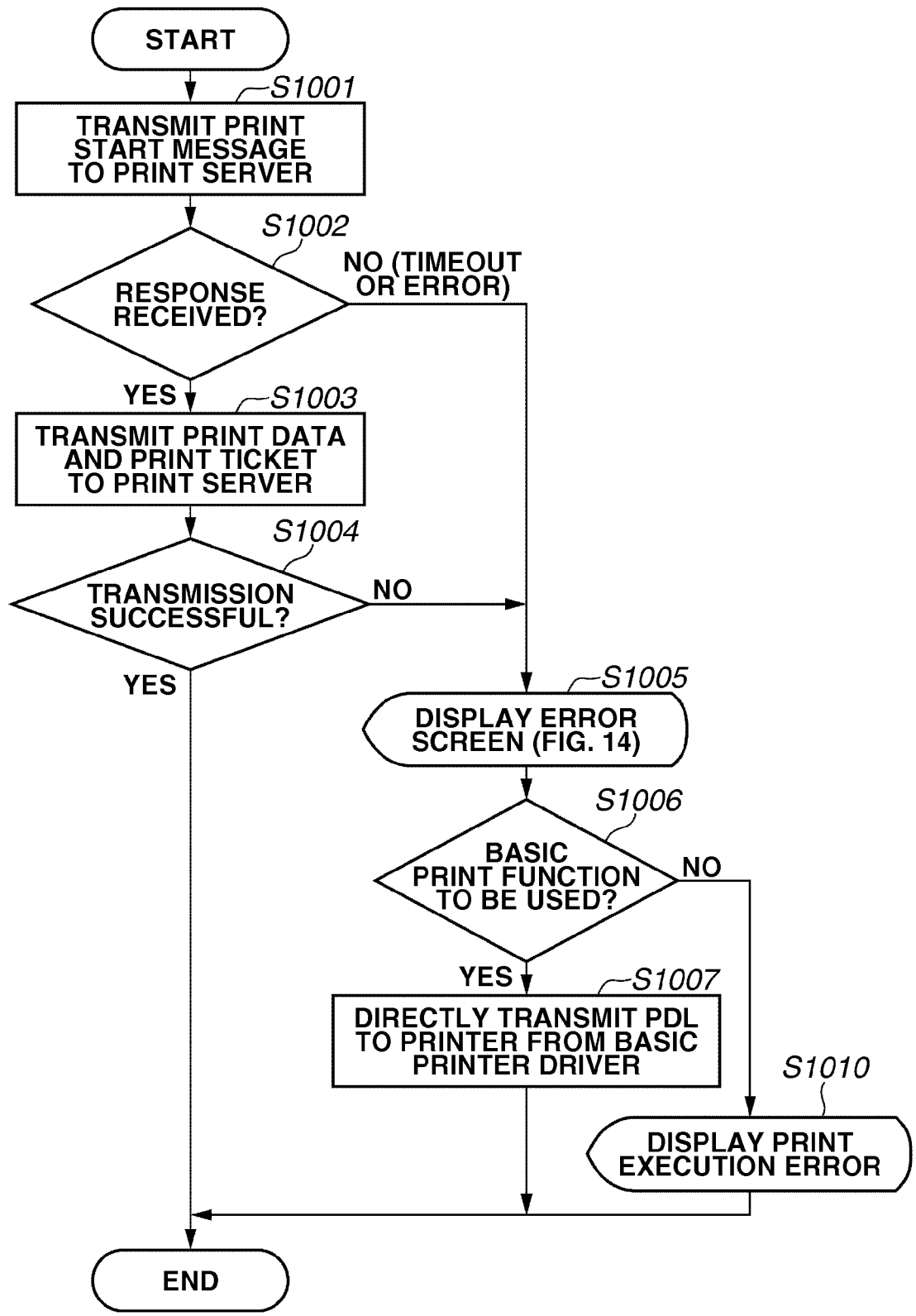
FIG. 10 is a flowchart illustrating print execution processing based on an extended print setting for the information processing apparatus according to the first exemplary embodiment.

FIG. 10 is a flowchart illustrating print execution processing including the extended print setting of the information processing apparatus 101. This processing illustrates detailed processing performed in step S910 illustrated in FIG. 9.

In step S1001, the print manager 123 controls transmission of a startup message to the print server 103 to start printing. In step S1002, the print manager 123 determines whether a response to the startup message is received from the print server 103. If a response is received (YES in step S1002), the processing proceeds to step S1003. If no response is received or a timeout occurs (NO in step S1002), the processing proceeds to step S1005.

In step S1003, the print manager 123 transmits a print ticket and print data corresponding to the data from the application 124 to the print server 103.

In step S1004, the print manager 123 analyzes the response of the transmission result from the print server 103 to determine whether the transmission to the print server 103 is successful. If the transmission of the print data and the print ticket is successful (YES in step S1004), the print manager 123 terminates the processing. If the transmission fails (NO in step S1004), the processing proceeds to step S1005.

Figure 14:
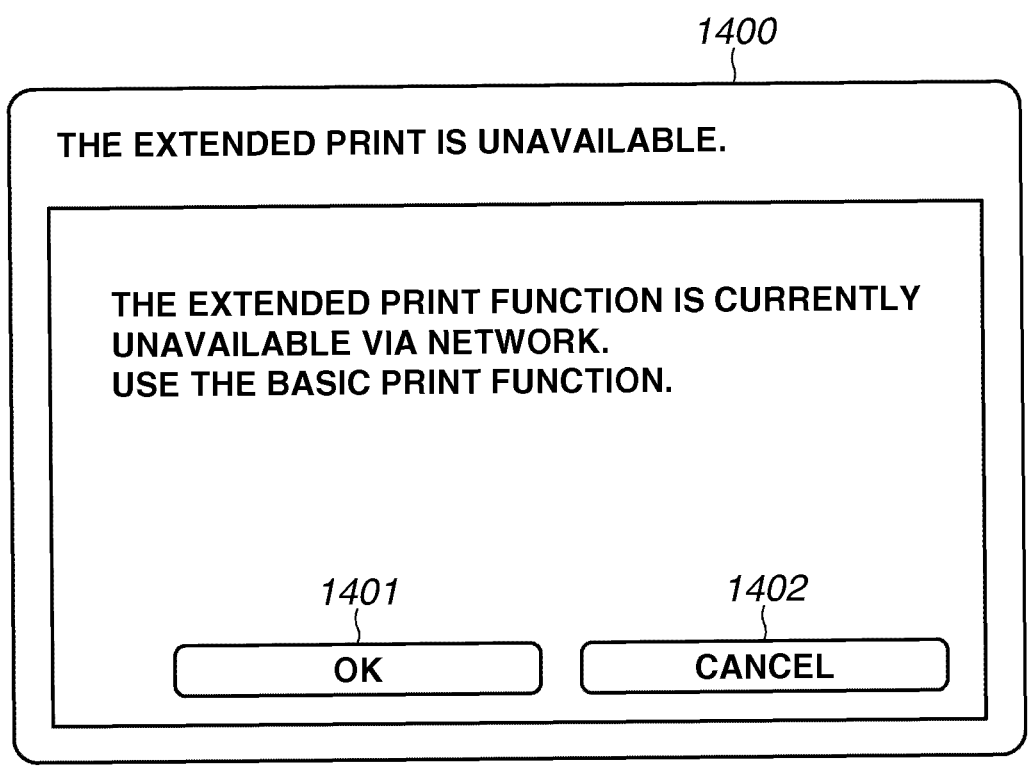
FIG. 14 illustrates an example UI providing an extended print function error message according to the first exemplary embodiment.

In step S1005, the print manager 123 displays a screen 1400 as illustrated in FIG. 14 containing an error message related to the extended print function.

In step S1006, the print manager 123 determines whether to use, in place thereof, a basic print function available from the basic printer driver 127 based on the user input through the error screen 1400. If the basic print function is used (YES in step S1066), the processing proceeds to step S1007. In this case, the user presses an OK button 1401 on the error screen 1400.

In step S1007, in order to perform print processing according to the setting on the print UI 1200, the basic printer driver 127 generates PDL data reflecting the setting and transmits the PDL data as a print job to the printer. Then, the processing is terminated. The use of the basic printer driver disables the extended print setting specified on the extended print setting UI 1240.

If the basic print function is not used (NO in step S1066), the processing proceeds to step S1010. In this case, the user presses a cancel button 1402 on the error screen 1400. The print manager 123 displays a print error (not illustrated), and then terminates the processing.

FIG. 11 is a flowchart illustrating print processing using the extended print setting of the print server. This processing is performed in cooperation with the processing of the information processing apparatus 101 described with reference to FIG. 10.

In step S1101, the print server continues to check whether an inquiry is received from the information processing apparatus 101. As an inquiry, the print server may receive the print processing startup message from the information processing apparatus 101 based on step S1001 in FIG. 10. In this case (YES in step S1101), the processing proceeds to step S1102.

In step S1102, the print manager 173 of the print server 103 determines whether the print is possible by a printer specified in the startup message. If the print is possible (YES in step S1102), the processing proceeds to step S1103. If the print is not possible (NO in step S1102), the processing proceeds to step S1110.

In step S1103, the print manager 173 determines whether the print data and the print ticket are transmitted from the information processing apparatus 101. If the print data and the print ticket are not transmitted (NO in step S1103), the processing proceeds to step S1110. If the print data and the print ticket are transmitted (YES in step S1103), the processing proceeds to step S1104 to perform reception processing.

In step S1105, the print manager 173 transmits the received data and the print ticket to the extended printer driver 175 corresponding to the target printer, and starts the print processing. In step S1106, the print manager 173 determines whether the print processing is successful. If the print processing is successful (YES in step S1106), the processing proceeds to step S1107. If the print processing fails (NO in step S1106), the processing proceeds to step S1110.

In step S1107, the print manager 173 transmits the processing result to the information processing apparatus 101, which is the request source, and terminates the processing. In step S1110, the print manager 173 transmits the error situation as error information to the information processing apparatus 101, which is a request source, and terminates the processing.

Figure 12B:
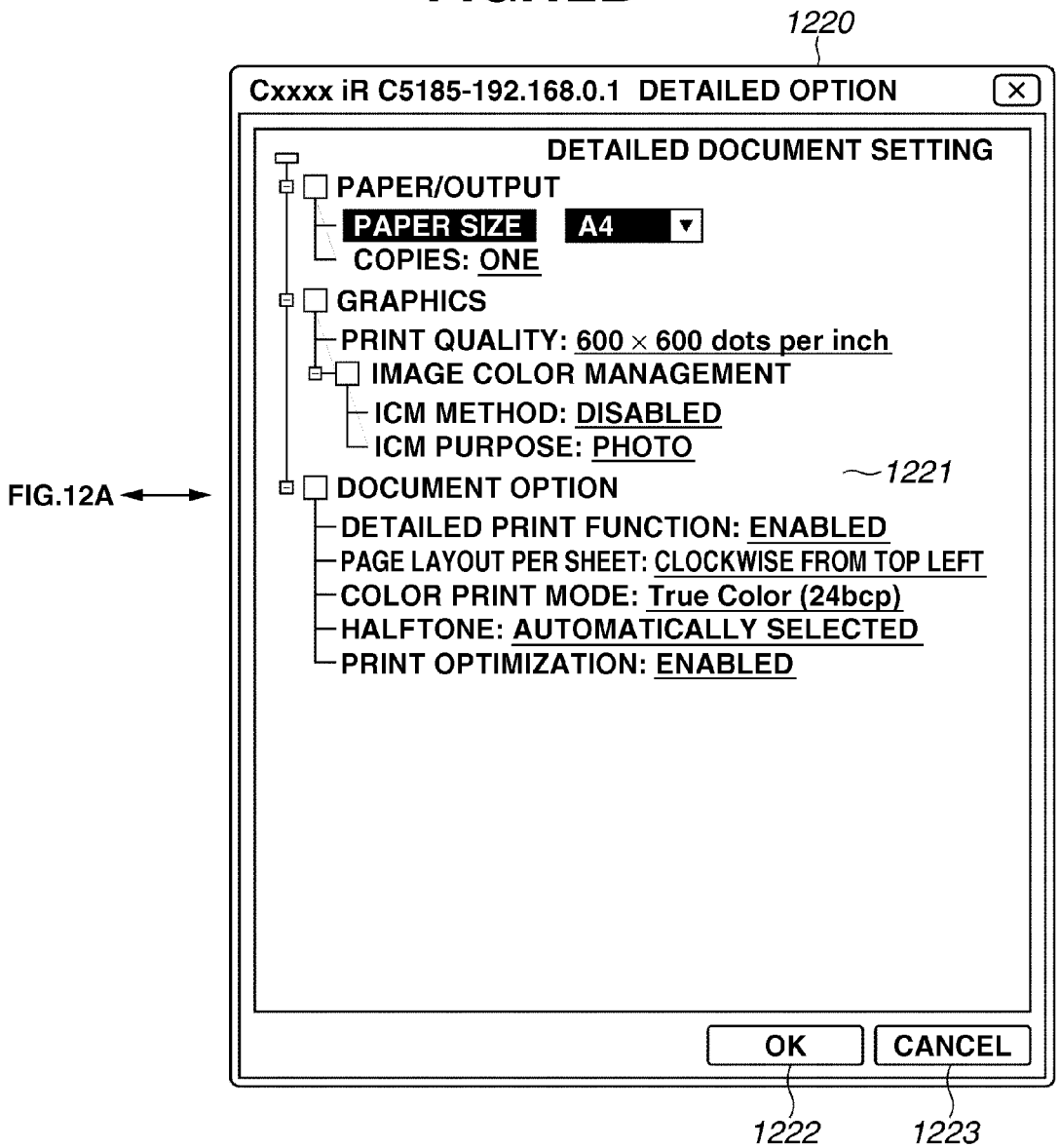

FIGS. 12A, 12B, and 12C illustrate transition of the print UI screens displayed on the information processing apparatus according to the above-described processing.

The OS 122 basically provides the print UI 1200 and a basic setting print UI 1220. Instead of these UIs, a UI specific to the application 124 may be used for printing through a print interface of the OS 122.

Due to the above-described restrictions, with the present exemplary embodiment, it is impossible to install an existing model-specific printer driver on the information processing apparatus and to provide a screen like the screen provided by the extended print setting UI 1240 as part of the function of the model-specific printer driver.

According to the present exemplary embodiment, the OS 122 can perform the control to switch the print UI 1200 to the extended print setting UI 1240 provided from the UI module as an application under a predetermined condition.

The print UI 1200 mainly includes the printer selection portion 1201, the detailed setting button 1202, a printer search button 1203, the print button 1205 the cancel button 1206, and an apply button 1207.

The basic setting print UI 1220 mainly includes a print setting portion 1221, the OK button 1222, and the cancel button 1223. The extended print setting UI 1240 mainly includes a print setting portion 1241, an OK button 1242, and a cancel button 1243.

In step S908, though not described referring to FIG. 9, the apply button 1207 may be pressed to close the extended print setting UI 1240 without performing the print processing. In this case, the print manager 123 updates the registered printer information according to a setting change by the user on the extended print setting UI 1240, and terminates the processing.

Next, a second exemplary embodiment of the present invention will be described.

An overall configuration of the network system and configurations of the apparatuses according to the second exemplary embodiment are similar to those illustrated in FIGS. 1 and 2. As a difference, the information processing apparatus 101 and the printer 102 are additionally provided with a Near Field Communication (NFC) I/F and an antenna, respectively. The OS 122 or the program ROM 133b includes a driver to drive the NFC I/F and the management software, enabling NFC and pairing functions.

According to the second exemplary embodiment, the UI module path in the functional configuration information as illustrated in FIG. 8 provides the uniform resource locator (URL) information that can be used to refer to a UI module of the print server 103 from a web browser operating on the information processing apparatus.

Figure 15:
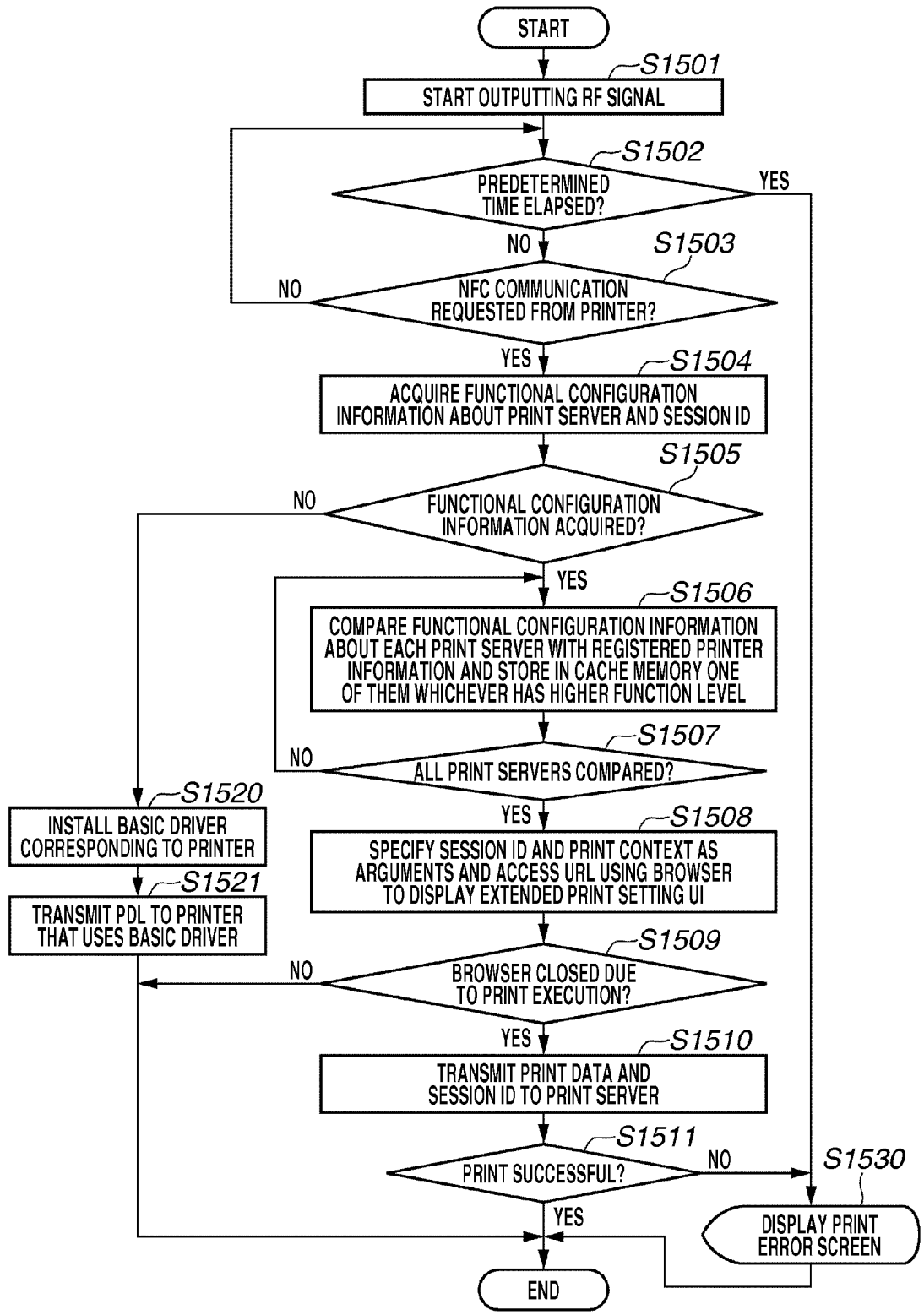
FIG. 15 is a flowchart illustrating an environment construction and extended print processing for an information processing apparatus according to a second exemplary embodiment.

FIG. 15 is a flowchart illustrating an environment construction and extended print processing of the information processing apparatus 101. Suppose that the printer 102 saves a log file 177 containing the functional configuration information about the print server according to the processing as illustrated in FIG. 6. The processing in FIG. 15 starts when the user performs various operations to specify a print target such as starting the application 124 operating on the information processing apparatus 101.

In step S1501, an NFC antenna of the information processing apparatus starts outputting an radio frequency (RF) signal. According to the present exemplary embodiment, for example, the print manager 123 of the information processing apparatus 101 outputs an RF signal after the print UI 1200 as illustrated in FIG. 12 is displayed. The RF signal output may start in response to manual input of the user who presses a button (not illustrated) on the print UI.

In step S1502, the print manager 123 determines whether a predetermined time has elapsed. If the predetermined time has elapsed (YES in step S1502), the processing proceeds to step S1530. In step S1503, before the predetermined time has elapsed, the print manager 123 determines whether the NFC communication has received from the printer. It is determined by the user placing the NFC antenna of the information processing apparatus near an NFC antenna of the printer 102 and checking whether the communication is performed. If the printer has received the NFC communication within the predetermined time according to the processing in steps S1502 and S1503 (YES in step S1503), the processing proceeds to step S1504.

In step S1504, the print manager 123 attempts to acquire the functional configuration information about the print server and a session identifier (ID) through the NFC. In step S1505, the print manager 123 determines whether the functional configuration information is acquired. If no functional configuration information is acquired (NO in step S1504), the processing proceeds to step S1520. If the functional configuration information is acquired (YES in step S1504), the processing proceeds to step S1506.

In step S1506, the print manager 123 compares the functional configuration information about each print server with the registered printer information and saves the information indicating a higher function level in the cache memory. In step S1507, the print manager 123 determines whether the function levels of all print servers are compared. If the function levels of all print servers are not compared (NO in step S1507), the processing returns to step S1506. If the function levels of all print servers are compared (YES in step S1507), the processing proceeds to step S1508.

In step S1508, the print manager 123 uses a web browser function to access the URL of a UI module corresponding to the extended function described in the functional configuration information. During the access, the print manager 123 passes two pieces of information as arguments, that is, the session ID acquired from the printer and the print context data as the print instruction information from the application 124. As a result, the extended print setting UI is displayed.

In step S1509, the print manager 123 determines whether the UI is closed in response to a print instruction performed on the extended print setting UI. When the user presses the print button 1205 after completing the extended print setting UI, a web script for the extended print setting UI closes the browser included in the OS 122. If the UI is closed in response to the print instruction (YES in step S1509), the processing proceeds to step S1510. If the UI is closed by other actions (NO in step S1509), the print manager 123 terminates the processing.

In step S1510, the print manager 123 transmits the print data and the session ID to the print server. In step S1511, the print manager 123 inquires the print server whether the print is successful. If the print is successful (YES in step S1511), the print manager 123 terminates the processing. If the print fails (NO in step S1511), the processing proceeds to step S1530.

In step S1520, the print manager 123 starts a basic printer driver corresponding to the printer. The print manager 123 installs the relevant basic printer driver if it is not installed in the information processing apparatus. In step S1521, the basic printer driver 127 generates PDL data and transmits it as a print job to the printer to perform the print processing. Then, the processing is terminated. The use of the basic printer driver disables the extended print setting specified on the extended print setting UI 1240.

In step S1530, the print manager 123 displays a print error screen indicating the unsuccessful print and then terminates the processing.

Figure 16:
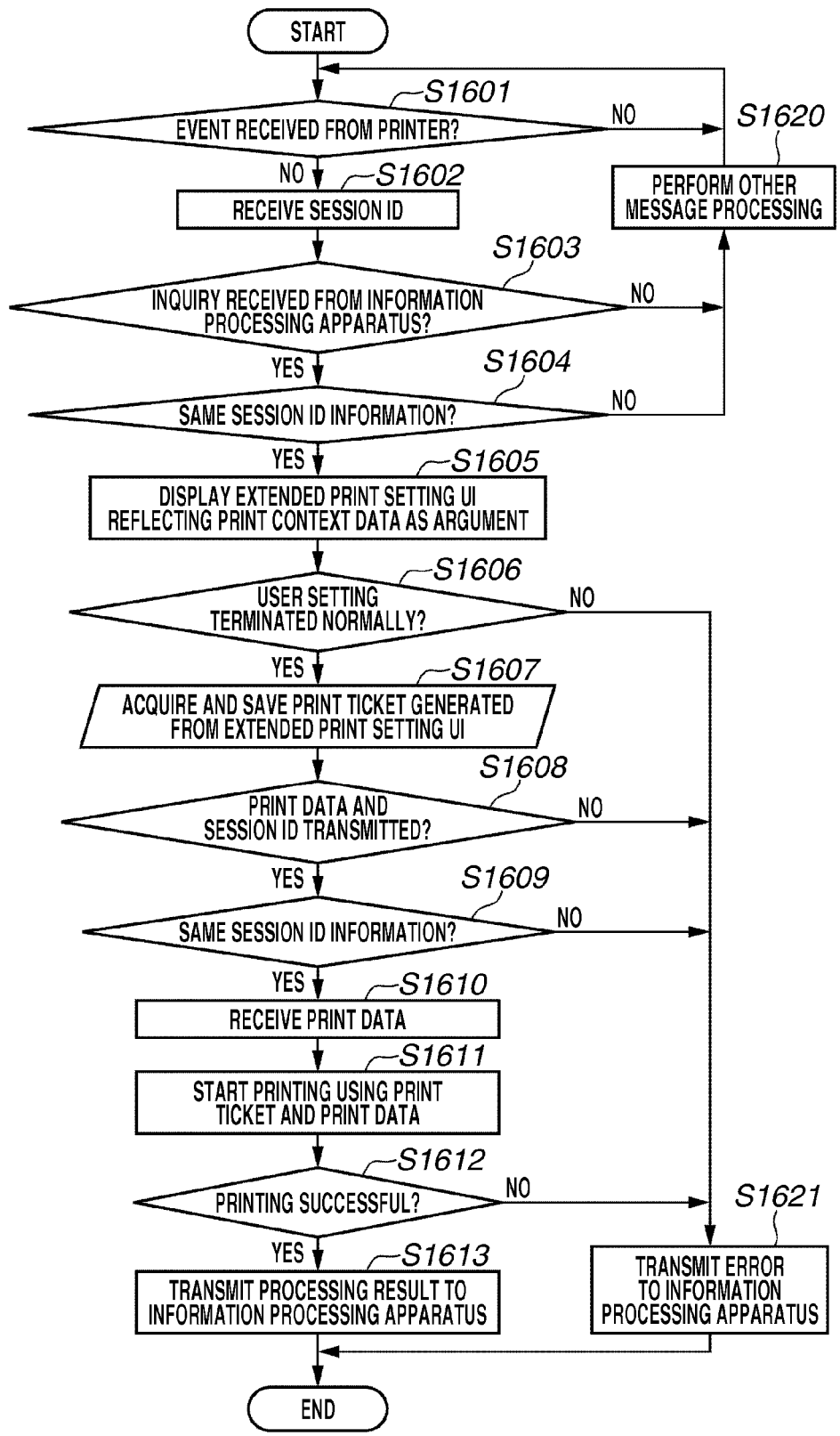
FIG. 16 is a flowchart illustrating print processing using an extended print setting for the information processing apparatus according to the second exemplary embodiment.

FIG. 16 is a flowchart illustrating print processing using the extended print setting of the print server 103.

In step S1601, the print manager 173 continues to check whether an inquiry event is received from the printer 102. If an inquiry event is received (YES in step S1601), the processing proceeds to step S1602. In step S1602, the print manager 173 receives the session ID contained in the event from the printer 102.

In step S1603, the print manager 173 determines whether an inquiry is received from the information processing apparatus 101. If an inquiry is received (YES in step S1603), the processing proceeds to step S1604. If an inquiry specific to the processing is not received (NO in step S1603), the processing proceeds to step S1620. In step S1620, the print manager 173 processes an error message, and then the processing returns to step S1601.

In step S1604, the print manager 173 determines whether a session ID in the inquiry from the information processing apparatus 101 equals to the session ID acquired in step S1602. If the session IDs are equal to each other (YES in step S1604), the processing proceeds to step S1605. If the session IDs differ (NO in step S1604), the processing proceeds to step S1620.

In step S1605, the print manager 173 uses a web service function of the OS 172 to display the extended print setting UI reflecting the print context data as an argument received from the information processing apparatus 101.

In step S1606, the print manager 173 receives a termination event of the web service function from the OS 172 and determines whether the user setting normally is terminated. If the user setting is normally terminated (YES in step S1606), the processing proceeds to step S1607 because the print setting by the user is completed. If the user setting is abnormally terminated or due to a timeout (NO in step S1606), the processing proceeds to step S1621. In step S1607, the print manager 173 acquires the print ticket generated from the extended print setting UI and saves it in the external memory 171.

In step S1608, the print manager 173 determines whether the print data and the session ID are transmitted from the information processing apparatus 101. If the print data and the session ID are transmitted (YES in step S1608), the processing proceeds to step S1609. If a timeout or an error is received (NO in step S1608), the processing proceeds to step S1621.

In step S1609, the print manager 173 determines whether the session ID transmitted along with the print data equals to the session ID acquired in step S1602. If the session IDs are equal to each other (YES in step S1609), the processing proceeds to step S1610. If the session IDs differ (NO in step S1609), the processing proceeds to step S1621. In step S1610, the print manager 173 performs the receiving processing of the print data.

In step S1611, the print manager 173 passes the received print data and the print ticket to the extended printer driver 175 to start printing. The generated print job is transmitted to the printer 102 to complete the print.

In step S1612, the print manager 173 determines whether the print processing is successful. If the print processing is successful (YES in step S1612), the processing proceeds to step S1613. If the print processing fails (NO in step S1612), the processing proceeds to step S1621. In step S1613, the print manager 173 returns the processing result to the information processing apparatus, which is a request source, and terminates the processing.

In step S1621, the print manager 173 transmits the error situation as error information to the information processing apparatus, which is a request source.

Figure 17:
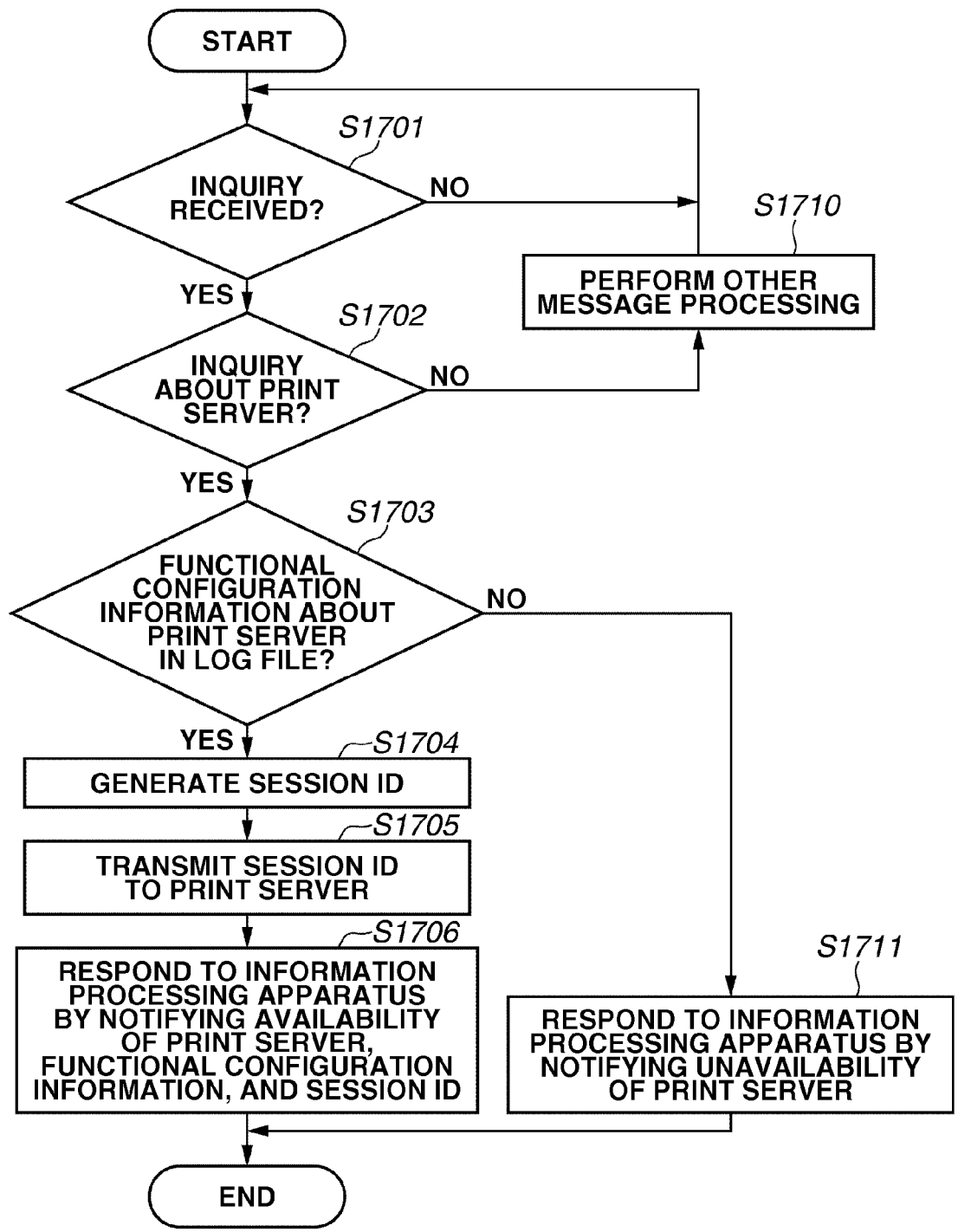
FIG. 17 is a flowchart illustrating searching processing of an extended print function for the printer according to the second exemplary embodiment.

FIG. 17 is a flowchart illustrating searching processing in the extended print function of the printer 102 according to the present exemplary embodiment. This processing is performed by the printer 102 to which the functional configuration information about the print server is requested in step S1504 in FIG. 15.

In step S1701, the printer 102 continues to check whether an inquiry is received from the information processing apparatus 101 via the NFC. If an inquiry is received (YES in step S1701), the processing proceeds to step S1702. In step S1702, the printer 102 determines whether the inquiry is about the print server. If the inquiry is about the print server (YES in step S1702), the processing proceeds to step S1703. Otherwise (NO in step S1702), the processing proceeds to step S1710. In step S1710, the printer 102 accordingly performs necessary processing, transmits a response to the information processing apparatus 101, and the processing returns to step S1701.

In step S1703, the printer 102 refers to the log file 143 in the external memory 134 and checks whether the log file 143 contains the functional configuration information. If the log file 143 does not contain the functional configuration information (NO in step S1703), the processing proceeds to step S1711. In step S1711, the printer 102 transmits a response indicating absence of the functional configuration information to the information processing apparatus 101, and terminates the processing. If the log file 143 contains the functional configuration information (YES in step S1703), the processing proceeds to step S1704.

In step S1704, the printer 102 generates a session ID. For example, the printer 102 by using a program in the program ROM 133b having the variable generation function generates a unique number as the session ID.

In step S1705, the printer 102 transmits the generated session ID as an event to the print server corresponding to the functional configuration information.

In step S1706, the printer 102 responds to the information processing apparatus by notifying presence of the print server capable of the extended print setting and the functional configuration information about the print server 103 as well as the session ID. The printer 102 then terminates the processing.

FIG. 18 schematically illustrates a processing flow in the printing system according to the first and second exemplary embodiments of the invention. For example, the processing flow includes specifying the extended print setting on the information processing apparatus such as a portable terminal linked with the print server and issuing a print job from the final print server. FIG. 18 helps to understand the overview of the above-described exemplary embodiments. A description with reference to FIG. 18 overlaps the above-described exemplary embodiments in many points and is therefore omitted.

According to the first and second exemplary embodiments, the information processing apparatus 101 acquires the functional configuration information about the print server 103 from the printer 102. However, the invention can be also implemented even if the printer 102 has a function that just provides address information about the associated print server 103. In this case, the information processing apparatus 101 directly acquires and analyzes the functional configuration information included in the print server 103 based on the address information of the print server 103.

An embodiment of the invention can provide a computer readable storage medium on which is stored a computer program for causing a computer to execute a method for a printer, the method comprising: responding to a request from an information processing apparatus with configuration information about a print server; receiving a print job issued from a print server using a print ticket including a setting specified through an extended print setting screen that is provided from the print server based on the configuration information and is displayed on the information processing apparatus; and performing print processing based on the print job.

Another embodiment of the invention can provide a computer readable storage medium on which is stored a computer program for causing a computer to execute a method for a print server, the method comprising: transmitting information for displaying an extended print setting screen for specifying a model-specific printer function on an information processing apparatus in response to a request from the information processing apparatus; receiving print data from the information processing apparatus; and issuing a print job to the printer using print data and a print ticket including a setting specified through the extended print setting screen.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-197214 filed Sep. 9, 2011, which is hereby incorporated by reference herein in its entirety.

What is claimed is:

1. A printing system including an information processing apparatus in which a printer driver for enabling a model-specific printer function to be used is not installed, a print server, and a printer, wherein
the printer includes at least a processor functioning as:
a response unit configured to respond to a request from a connected information processing apparatus with configuration information about the print server,
the information processing apparatus includes at least a processor functioning as:
a display unit configured to control display of an extended print setting screen for specifying a model-specific printer function, based on the configuration information, and
a transmission unit configured to transmit print data to the print server, and
the print server includes at least a processor functioning as:
an issuing unit configured to issue a print job to the printer using a print ticket, which contains a setting specified through the extended print setting screen and the print data,
wherein the configuration information includes information for downloading an application that provides the extended print setting screen, and
wherein the display unit of the information processing apparatus is configured to control display of the extended print setting screen using the application downloaded based on the configuration information.

2. The printing system according to claim 1, wherein the configuration information includes address information for accessing a web page providing the extended print setting screen of the print server and print management identification information, and
the display unit of the information processing apparatus is configured to use the address information and the print management identification information included in the configuration information to access the web page, and to control display of the extended print setting screen.

3. The printing system according to claim 2,
wherein the response unit of the printer is configured to transmit the print management identification information to the print server,
the transmission unit of the information processing apparatus is configured to transmit the print management identification information and the print data to the print server, and
the issuing unit of the print server is configured to issue the print job using the print ticket and the print data, which are associated with each other by the print management identification information.

4. A printer comprising at least a processor functioning as:
a response unit configured to respond to a request from an information processing apparatus with configuration information about a print server,
a reception unit configured to receive a print job issued from the print server using a print ticket containing a setting specified through an extended print setting screen, which is displayed on the information processing apparatus based on the configuration information, and
a print unit configured to perform print processing based on the print job,
wherein the configuration information includes information for downloading an application that provides the extended print setting screen.

5. The printer according to claim 4, wherein the processor further functions as:
a generation unit configured to generate print management identification information when a request is received from the information processing apparatus,
wherein the configuration information includes the print management identification information and address information for accessing a web page that provides the extended print setting screen of the print server, and
the response unit is further configured to transmit the print management identification information to the print server.

6. A print server comprising at least a processor functioning as:
a first reception unit configured to receive print management identification information from a printer,
a transmission unit configured to transmit, to an information processing apparatus, information for displaying an extended print setting screen for specifying a model-specific printer function, in response to a request using the print management identification information from the information processing apparatus,
a storage unit configured to store a print ticket containing a setting specified through the extended print setting screen in association with the print management identification information corresponding to the request,
a second reception unit configured to receive print data and print management identification information from the information processing apparatus, and
an issuing unit configured to issue a print job to the printer using the received print data and the stored print ticket in association with the print management identification information received by the second reception unit.

7. The print server according to claim 6, wherein the transmission unit is configured to transmit information of a web page as the information for displaying the extended print setting screen.

8. A method in a printing system including an information processing apparatus in which a printer driver for enabling a model-specific printer function to be used is not installed, a print server, and a printer, the method comprising:
- responding, via the printer, to a request from a connected information processing apparatus with configuration information about the print server;
- controlling, via the information processing apparatus, display of an extended print setting screen for specifying a model-specific printer function, based on the configuration information; and
- transmitting, via the information processing apparatus, print data to the print server;
- issuing, via the print server, a print job to the printer using a print ticket, which contains a setting specified through the extended print setting screen and the print data,
- wherein the configuration information includes information for downloading an application that provides the extended print setting screen, and
- wherein controlling display includes controlling display of the extended print setting screen using the application downloaded based on the configuration information.

9. A method in a printer comprising:
- responding to a request from an information processing apparatus with configuration information about a print server;
- receiving a print job issued from the print server using a print ticket containing a setting specified through an extended print setting screen, which is displayed on the information processing apparatus based on the configuration information; and
- performing print processing based on the print job,
- wherein the configuration information includes information for downloading an application that provides the extended print setting screen.

10. A method in a print server comprising:
- receiving print management identification information from a printer;
- transmitting, to an information processing apparatus, information for displaying an extended print setting screen for specifying a model-specific printer function, in response to a request using the print management identification information from the information processing apparatus;
- storing a print ticket containing a setting specified through the extended print setting screen in association with the print management identification information corresponding to the request;
- receiving print data and print management identification information from the information processing apparatus; and
- issuing a print job to the printer using the received print data and the stored print ticket in association with the received print management identification information.

11. A non-transitory computer-readable storage medium on which is stored a computer program for causing a computer to execute a method for a printer, the method comprising:
- responding to a request from an information processing apparatus with configuration information about a print server;
- receiving a print job issued from the print server using a print ticket containing a setting specified through an extended print setting screen, which is displayed on the information processing apparatus based on the configuration information; and
- performing print processing based on the print job,
- wherein the configuration information includes information for downloading an application that provides the extended print setting screen.

12. A non-transitory computer-readable storage medium on which is stored a computer program for causing a computer to execute a method for a print server, the method comprising:
- receiving print management identification information from a printer;
- transmitting, to an information processing apparatus, information for displaying an extended print setting screen for specifying a model-specific printer function, in response to a request using the print management identification information from the information processing apparatus;
- storing a print ticket containing a setting specified through the extended print setting screen in association with the print management identification information corresponding to the request;
- receiving print data and print management identification information from the information processing apparatus; and
- issuing a print job to the printer using the received print data and the stored print ticket in association with the received print management identification information.

* * * * *